United States Patent Office 3,547,920
Patented Dec. 15, 1970

---

3,547,920
PHOSPHORIC, PHOSPHONIC, THIONOPHOSPHORIC AND THIONOPHOSPHONIC ACID ESTERS
Christa Fest, Wuppertal-Elberfeld, Ingeborg Hammann, Cologne, Wilhelm Stendel, Wuppertal-Vohwinkel, and Gunter Unterstenhofer, Opladen, Germany, assignors to Farbenfabriken Bayer Aktiengesellschaft, Leverkusen, Germany, a corporation of Germany
No Drawing. Filed Jan. 22, 1969, Ser. No. 793,169
Claims priority, application Germany, Feb. 2, 1968, 1,670,983
Int. Cl. C07d 51/04
U.S. Cl. 260—250   10 Claims

ABSTRACT OF THE DISCLOSURE

O,O-(pyridazin-di-3,6-yl)-di[(alkyl, alkoxy and phenyl)-O-alkyl- -phosphoric, phosphonic, thionophosphoric and thionophosphonic] acid esters, i.e., O-[3-(alkyl, alkoxy and phenyl]-O-alkyl- -phosphoryl, -phosphonyl, -thionophosphoryl and -thionophosphonyl)-pyridazin-6-yl]-[alkyl, alkoxy and phenyl]-O-alkyl- -phosphoric phosphonic, thionophosphoric and thionophosphonic acid esters, which possess arthropodicidal, especially acaricidal and insecticidal, properties and which may be produced by reacting the corresponding phosphoric, phosphonic, thionophosphoric or thionophosphonic acid ester halide with maleic acid hydrazide in the presence of an acid-binding agent.

---

The present invention relates to and has for its objects the provision for particular new O,O-(pyridazin-di-3,6 - yl)-di[(alkyl, alkoxy and phenyl)-O-alkyl- -phosphoric, phosphonic, thionophosphoric and thionophosphonic] acid esters, i.e. O-[3-alkyl, alkoxy and phenyl]-O-alkyl-phosphoryl, -phosphonyl, -thionophosphoryl and -thionophosphonyl) -pyridazin-6-yl]-[alkyl, alkoxy and phenyl] - O-alkyl-phosphoric, phosphonic, thionophosphoric, thionophosphonic acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

In German published patents (DAS) 1,018,870 and 1,018,871 there are described O,O-dialkyl-O-[pyridazinyl-(3)]- or O,O-dialkyl-O-[pyridazinone - (6)-yl - (3)-]- phosphoric or -thionophosphoric acid esters. These compounds can among other things be prepared by reaction of equimolar amounts of the appropriate O,O-dialkyl (thiono)-phosphoric acid ester chlorides and maleic acid hydrazide.

It has been found in accordance with the present invention that the particular new pyridazinyl di- phosphorus acid esters of the formula

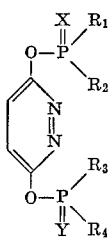

in which $R_1$ and $R_3$, each individually, is lower alkoxy of 1–6 carbon atoms;

$R_2$ and $R_4$, each individually, is lower alkyl of 1–6 carbon atoms, lower alkoxy of 1–6 carbon atoms, or phenyl; and X and Y, each individually, is oxygen or sulfur; exhibit strong arthropodicidal, especially insecticidal and acaricidal, properties.

The present invention also provides a process for the production of compounds of Formula I above in which a phosphoric, phosphonic, thionophosphoric or thionophosphonic acid ester halide of the formula

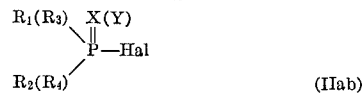

is reacted with maleic acid hydrazide in the presence of an acid-binding agent.

In Formula IIab, $R_1$, $R_2$, $R_3$, $R_4$, X and Y are the same as defined above, and Hal is a halogen atom, preferably chloro.

Advantageously, the particular new compounds of Formula I are distinguished by outstanding insecticidal and acaricidal properties as well as, in some cases, extremely low toxicity to warm-blooded animals and concomitantly low phytotoxicity. The instant compounds possess a very strong activity against both eating and sucking insects as well as against ticks, and are in this respect superior to comparable known compounds of analogous constitution and the same type of activity. The new compounds of the present invention therefore represent a genuine enrichment of the art.

The course of the two inherent steps of the process of the invention is illustrated by the following reaction schemes:

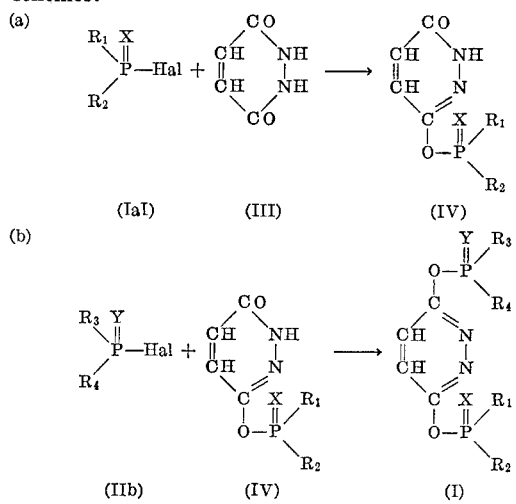

in which the symbols $R_1$, $R_2$, $R_3$, $R_4$, X, Y and Hal are the same as defined above.

Advantageously, in accordance with the present invention, in the various formulae herein:

$R_1$ and $R_3$, each individually, represents

Straight and branched chain lower alkoxy of 1 to 6 carbon atoms such as methoxy to tert.-butoxy inclusive, especially methoxy, ethoxy, n- and iso-propoxy, n-, iso- and sec.-butoxy, and the like, n-amyloxy, n-hexyloxy, and the like, and more especially alkoxy of 1–4 or 1–3, and preferably 1–2, carbon atoms;

$R_2$ and $R_4$, each individually, represents

Straight and branched chain lower alkyl having 1–6 carbon atoms such as methyl to tert.-butyl inclusive, especially methyl, ethyl, n- and iso-propyl, n-, iso- and sec.-butyl, and the like, n-amyl, n-hexyl, pinacolyl (i.e. [CH$_3$]$_3$C-[CH$_3$]CH-) and the like and more especially alkyl of 1–4 or 1–3, and preferably 1–2, carbon atoms; or Lower alkoxy of 1 to 6 carbon atoms as defined above such as methoxy to tert.-butoxy inclusive as defined above, n-amyloxy, n-hexyloxy, pinacolyloxy, and the like, and more especially alkoxy of 1–4 or 1–3, and preferably 1–2, carbon atoms; or phenyl;

$R_1$ and $R_3$ being the same or different, $R_2$ and $R_4$ being the same or different, i.e. each of $R_1$, $R_2$, $R_3$ and $R_4$, as the case may be, being the same or different; and X and Y, each indivdually, represents oxygen; or sulfur.

In particular, $R_1$ and $R_3$, each individually, is $C_{1-4}$ alkoxy, especially the same $C_{1-4}$ alkoxy; $R_2$ and $R_4$, each individually, is $C_{1-4}$ alkyl, $C_{1-4}$ alkoxy or phenyl; and X and Y are oxygen and/or sulfur, preferably sulfur except where $R_1$ and $R_2$, or $R_3$ and $R_4$, are both $C_{1-4}$ alkoxy, especially the same $C_{1-4}$ alkoxy.

When carrying out the production process, the free maleic acid hydazide of Formula III above is used and the reaction is caused to proceed in the presence of an acid-binding agent. For this purpose, practically all customary acid acceptors, i.e. acid-binding agents, can be used. Among those which have proved particularly suitable are alkali metal alcoholates and carbonates, such as sodium or potassium methylate, ethylate and carbonate; and tertiary aliphatic, aromatic or heterocyclic amines, for example triethylamine, dimethylaniline, dimethylbenzylamine or pyridine; and the like.

The production process of the present invention is preferably carried out in the presence of a solvent (this term includes a mere diluent). Practically all inert organic solvents or mixtures thereof are suitable, such as hydrocarbons, for example benzine, benzene, toluene, chlorobenzene, xylene; ethers, for example, diethyl ether, dibutyl ether, dioxan; ketones, for example, acetone, methyl-ethyl ketone, methyl-isopropyl ketone, methyl-isobutyl ketone; and the like; particularly good results have been obtained with low-boiling aliphatic alcohols, for example methanol and ethanol, and especially nitriles, for example acetonitrile, propionitrile; as well as dimethyl formamide; and the like.

When carrying out the production reaction, the temperature can be varied within a fairly wide range. In general, the work is carried out substantially between about 30 and 70° C. The starting materials and any auxiliary materials to be used (such as the acid-binding agent) are, in general, used in equimolar amounts.

When the (thiono)-phosphoric (-onic) acid ester halide used, i.e. of Formula II$ab$ above, has radicals $R_1$ and $R_3$ or $R_2$ and $R_4$, as defined above, which are the same, and X is the same as Y, as defined above, then 2 mols of the ester halide are normally used per mol of maleic acid hydrazide. Otherwise, it is usual to add first 1 mol of ester halide of the formula:

(IIa)

in which $R_1$, $R_2$, X and Hal are the same as defined above, dropwise to the maleic acid hydrazide, with stirring, and, after several hours, one mol of ester halide of the formula:

(IIb)

in which $R_3$, $R_4$, Y and Hal are the same as defined above, to the reaction mixture.

After combining the starting components, it is advantageous to continue stirring of the mixture for a longer period (3 to 7 hours) in order to complete the reaction.

The products which are thus produced are then frequently obtained in good yields and high purity.

Some of the phosphoric, phosphonic, thionophosphoric and thionophosphonic acid esters which can be prepared by the process of the present invention are obtained in the form of colorless to yellow-colored, viscous, water-insoluble oils which, by so-called "slight distillation," i.e. longer heating to moderately elevated temperatures under reduced pressure, can be freed from the last volatile components and in this way be purified. Some are crystalline compounds, which can be well purified by recrystallization from the customary solvents. Their structure can be identified from infra-red and nuclear magnetic resonance spectra.

Advantageously, as mentioned above, the instant new compounds are distinguished by outstanding insecticidal and acaricidal effectiveness. The effect sets in rapidly and is long-lasting. The instant compounds have at the same time only slight toxicity to warm-blooded animals and concomitantly slight phytotoxicity. For this reason, the instant compounds can be used with success in plant protection for the control of noxious sucking and eating insects and Diptera, and in both plant protection and the veterinary field against mites (Acarina). Particularly to be emphasized in this connection is the excellent effectiveness of the instant new active compounds against spider mite strains resistant to phosphoric acid esters.

To the sucking insects contemplated herein there belong, in the main, aphids (Aphidae) such as the green peach aphid (Myzus persicae), the bean aphid (Doralis fabae), the bird cherry aphid (Rhopalosiphum padi.), the pea aphid (Macrosiphum pisi) and the potato aphid (Macrosiphum solanifolii), the current gall aphid (Cryptomyzus korschelti), the mealy apple aphid (Sappaphis mali), the mealy plum aphid (Hyalopterus arundinis) and the cherry black-fly (Myzus cerasi); in addition, scales and mealy-bugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there may be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma neustria); further, the cabbage moth (Mamestra brassicae) and the cut-worm (Agrotis segetum), the large white butterfly (Pieris brassicae), the small winter moth (Cheimatobia brumata), the green oak tortrix moth (Tortrix viridana), the fall army-worm (Laphygma frugiperda) and cotton worm (Prodenia litura), the ermine moth (Hyponomeuta padella), the Mediterranean flour moth (Ephestia kühniella) and greater wax moth (Galleria mellonella); and the like.

Also to be classed with the biting insects contemplated herein are beetles (Coleoptera), for example the granary weevil (Sitophilus granarius—Calancra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius—Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow meal-worm (Tenebrio molitor) and the saw-toothed grain beetle (Oryzaephilus surinamensis), but also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Gryllus domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanolgaster*), the Mediterranean fruit fly (*Ceratitus capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (*Tetranychidae*) such as the two-spotted spider mite (*Tetranychus telarius—Tetranychus althaeae* or *Tetranychus urticae*) and the European red mite (*Paratetranychus pilosus—Panonychus ulmi*), blister mites, for example the current blister mite (*Eriophyes ribis*) and tarsonemids (for example the broad mite (*Hemitarsonemus latus*) and the cyclamen mite (*Tarsonemus pallidus*); finally, ticks, such as the relapsing fever tick (*Ornithodorus moubata*); and the like.

When used against hygiene pests and pests of stored products, particularly flies and gnats, the instant new compounds are further distinguished by an outstanding residual activity on wood and clay as well as a good stability to alkali on limed substrates.

The active compounds according to the instant invention can be utilized, if desired, in the form of the usual formulations or compositions with inert conventional pesticidal diluents or extenders, i.e. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with inert conventional pesticidal dispersible liquid diluent carriers and/or dispersible solid carriers optionally wth the use of carrier vehicle assistants, e.g. conventional pesticidal surface-active agents, including emulsifying agents and/or dispersing agents, whereby, for example, in the case where water is used as diluent, organic solvents may be added as auxiliary solvents. the following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides or insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–05%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre are sufficient. In this process it is possible to use highly concentrated liquid compositions with said liquid carrier vehicles containing from about 20 to about 95% by weight of active campound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprises applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples:

EXAMPLE 1

Bombyx test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent which contains the stated amount of emulsifier, and the resulting concentrate is diluted with water to the desired final concentration.

Mulberry leaves (*Morus alba*) are sprayed with the preparation of the given active compound until dew-moist and are then infested with caterpillars of the silk moth.

After the specified period of time, the degree of destruction is determined as a percentage. 100% means that all the caterpillars were killed, whereas 0% means that no caterpillars were killed.

The particular active compounds tested, their concentrations, the evaluation time and the results obtained can be seen from the following Table 1.

TABLE 1

| Active compound (constitution) | Concentration of active compound in percent | Degree of destruction in percent after 3 days |
|---|---|---|
| (A) 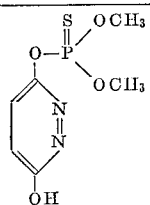 (Known from German published Patent 1,018,870.) | 0.1 | 0 |
| ($1_1$) 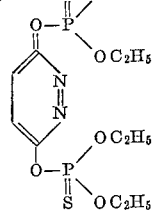 | 0.1<br>0.01<br>0.001 | 100<br>100<br>100 |
| ($2_1$) 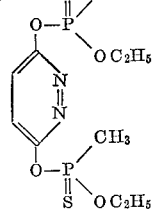 | 0.1<br>0.01 | 100<br>55 |
| ($3_1$) 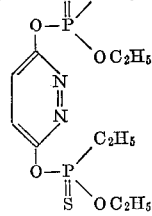 | 0.1<br>0.01<br>0.001 | 100<br>100<br>80 |

TABLE 1—Continued

| Active compound (constitution) | Concentration of active compound in percent | Degree of destruction in percent after 3 days |
|---|---|---|
| ($4_1$) 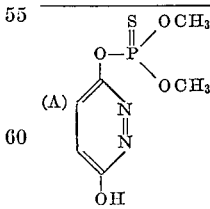 | 0.1 | 100 |
| ($5_1$) 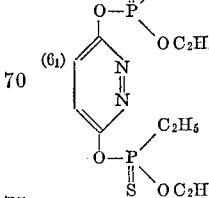 | 0.1<br>0.01 | 100<br>100 |

EXAMPLE 2

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Cabbage leaves (*Brassica oleracea*) are sprayed with the preparation of the given active compound until dripping wet and then infested with mustard beetle larvae (*Phaedon cochleariae*).

After the specified period of time, the degree of destruction is determined as a percentage: 100% means that all the beetle larvae are killed; 0% means that none of the beetle larvae are killed.

The particular active compounds tested, their concentrations, the evaluation time and the results obtained can be seen from the following Table 2.

TABLE 2

| Active compound (constitution) | Concentration of active compound in percent | Degree of destruction in percent after 48 hours |
|---|---|---|
| (A) (Known from German published Patent 1,018,870.) | 0.1<br>0.01<br>0.001 | 100<br>100<br>0 |
| ($6_1$) | 0.1<br>0.01<br>0.001 | 100<br>100<br>100 |

EXAMPLE 3

Rhopalosiphum test (systemic action)

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Oat plants (*Avena sativa*) which has been strongly infested with oat aphids (Rhopalosiphum padi) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100% means that all the aphids are killed whereas 0% means that none of the aphids are killed.

The paricular active compounds tested, their concentrations, the evaluation time and the results obtained can be seen from the following Table 3.

TABLE 3

| Active compound (constitution) | Concentration of active compound in percent | Degree of destruction in percent after 4 days |
|---|---|---|
| (A) [structure: pyridazine with S,OCH$_3$/OCH$_3$ phosphate; OH group] (Known from German published Patent 1,018,870.) | 0.1<br>0.01 | 100<br>0 |
| (7$_1$) [structure: pyridazine with S,OC$_2$H$_5$/OC$_2$H$_5$ phosphate and CH$_3$,OC$_2$H$_5$/S phosphate] | 0.1<br>0.01<br>0.001 | 100<br>100<br>60 |
| (8$_1$) [structure: pyridazine with S,OCH$_3$/OCH$_3$ phosphate and phenyl,OC$_2$H$_5$/S phosphate] | 0.1<br>0.01 | 100<br>75 |
| (9$_1$) [structure: pyridazine with O,OC$_2$H$_5$/OC$_2$H$_5$ phosphate and OC$_2$H$_5$,OC$_2$H$_5$/S phosphate] | 0.1<br>0.01 | 100<br>100 |
| (10$_1$) [structure: pyridazine with O,OC$_2$H$_5$/OC$_2$H$_5$ phosphate and C$_2$H$_5$,OC$_2$H$_5$/S phosphate] | 0.1<br>0.01 | 100<br>95 |

EXAMPLE 4

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final conccentration.

Bean plants (*Phaseolus vulgaris*), which have a height of approximately 10–30 cm., are sprayed with the preparation of the given active compound until dripping wet. These bean plants are heavily infested with spider mites (*Tetranychus urticae*) in all stages of development.

After the specified period of time, the effectiveness of the preparation of active compound is determined by counting the dead mites. The degree of destruction thus obtained is expressed as a percentage: 100% means that all the spider mites are killed whereas 0% means that none of the spider mites are killed.

The particular active compounds tested, their concentrations, the evaluation time and the result obtained can be seen from the following Table 4.

TABLE 4

| Active compound (constitution) | Concentration of active compound in percent | Degree of destruction in percent after 48 hours |
|---|---|---|
| (A) [structure: pyridazine with S,OCH$_3$/OCH$_3$ phosphate; OH group] (Known from German published Pat. 1,018,870.) | 0.1 | |
| (1$_2$) [structure: pyridazine with S,OC$_2$H$_5$/OC$_2$H$_5$ phosphate and OC$_2$H$_5$,OC$_2$H$_5$/S phosphate] | 0.1<br>0.01 | 100<br>98 |

TABLE 4—Continued

| Active compound (constitution) | Concentration of active compound in percent | Degree of destruction in percent after 48 hours |
|---|---|---|
| (7₂) [structure: O,O-diethyl thiophosphate on pyridazine with O-methyl-O-ethyl thiophosphate] | 0.1<br>0.01<br>0.001 | 100<br>100<br>95 |
| (6₂) [structure: O,O-diethyl thiophosphate on pyridazine with ethyl-O-ethyl thiophosphate] | 0.1<br>0.01<br>0.001 | 100<br>100<br>90 |
| (5₂) [structure: O,O-diethyl thiophosphate on pyridazine with phenyl-O-ethyl thiophosphate] | 0.1 | 100 |
| (2₂) [structure: methyl-O-ethyl thiophosphate on pyridazine with methyl-O-ethyl thiophosphate] | 0.1<br>0.01 | 100<br>99 |
| (3₂) [structure: ethyl-O-ethyl thiophosphate on pyridazine with ethyl-O-ethyl thiophosphate] | 0.1 | 95 |
| (4₂) [structure: methyl-O-ethyl thiophosphate on pyridazine with ethyl-O-ethyl thiophosphate] | 0.1<br>0.01 | 100<br>50 |

TABLE 4—Continued

| Active compound (constitution) | Concentration of active compound in percent | Degree of destruction in percent after 3 days |
|---|---|---|
| (11₁) [structure: phenyl-O-ethyl thiophosphate on pyridazine with methyl-O-ethyl thiophosphate] | 0.1 | 100 |
| (9₂) [structure: O,O-diethyl phosphate on pyridazine with O,O-diethyl thiophosphate] | 0.1<br>0.01 | 100<br>45 |
| (12₁) [structure: O,O-diethyl phosphate on pyridazine with methyl-O-ethyl phosphate] | 0.1 | 100 |
| (10₂) [structure: O,O-diethyl phosphate on pyridazine with ethyl-O-ethyl thiophosphate] | 0.1 | 100 |

The following further examples illustrate, without limitation, the process for producing the particular new compounds of the present invention:

EXAMPLE 5

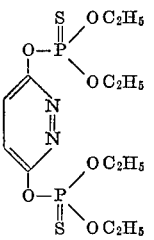

(1₃)

33 g. (0.3 mol) maleic acid hydrazide are dissolved in 150 ml. acetonitrile. 60 g. (0.6 mol) triethylamine are added to this solution. 116 g. (0.6 mol) O,O-diethyl-thionophosphoric acid ester chloride are then added dropwise at 40° C. to the reaction mixture and the latter is kept at this temperature for 3 hours. Thereafter the mixture is further stirred at room temperature for several hours and the precipitated triethylammonium hydrochloride is filtered off with suction; a little water is added to the filtrate, which is then taken up in chloroform. The chloroform layer is dried, the solvent is drawn off under greatly reduced pressure, and the reaction product is distilled. It melts at 78° C.

The yield is 105 g. (84% of the theory) of O,O-(pyridazin-di-3,6-yl)-bis (O,O-diethyl - thionophosphoric) acid ester, i.e. O-[3-(O,O-diethyl-thionophosphoryl) - pyridazin-6-yl]-O,O-diethyl-thionophosphoric acid ester.

*Analysis.*—Calculated for $C_{12}H_{22}N_2O_6P_2S_2$: (molecular weight 416) N, 6.74%; P, 14.92%; S, 15.40%. Found: N, 7.21%; P, 14.82%; S, 14.76%. Refractive index: $n_D^{21}=1.5159$.

In analogous manner, the following compounds can be prepared:

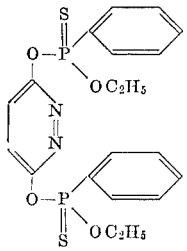

(13₁)

M.P. 55° C.

Yield: 26% of the theory of O,O-(pyridazin-di-3,6-yl)-bis(phenyl-O-ethyl-thionophosphonic) acid ester, i.e. O-[3-(phenyl - O - ethyl-thionophosphonyl)-pyridazin-6-yl]-phenyl-O-ethyl-thionophosphonic acid ester.

*Analysis.*—Calculated for $C_{20}H_{22}N_2O_4P_2S_2$: (molecular weight 480) N, 5.83%; P, 12.92%; S, 13.33%. Found: N, 6.31%; P, 12.49%; S, 12.85%.

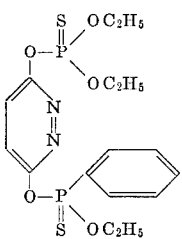

(5₃)

M.P. 68° C.

Yield: 83.5% of the theory of O,O-(pyridazin-di-3,6-yl)-O,O-diethyl - thionophosphoric) - (phenyl-O-ethyl-thionophosphonic) di acid ester, i.e. O-[3-(O,O-diethyl-thionophosphoryl) - pyridazin-6-yl]-phenyl - O - ethyl-thionophosphonic acid ester.

*Analysis.*—Calculated for $C_{16}H_{22}N_2O_5P_2S_2$: (molecular weight 448) N, 6.24%; P, 13.83%; S, 14.29%. Found: N, 6.21%; P, 13.93%; S, 13.94%.

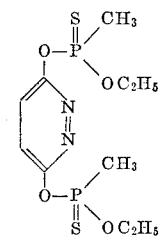

(2₃)

M.P. 112° C.

Yield: 49% of the theory of O,O-(pyridazin-di-3,6-yl)-bis(methyl-O-ethyl-thionophosphonic) acid ester, i.e. O-[3-(methyl - O - ethyl - thionophosphonyl)-pyridazin-6-yl]-methyl-O-ethyl-thionophosphonic acid ester.

*Analysis.*—Calculated for $C_{10}H_{18}N_2O_4P_2S_2$: (molecular weight 356) N, 7.87%; S, 17.98%. Found: N, 7.58%; S, 17.10%.

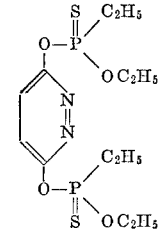

(3₃)

M.P. 64° C.

Yield: 56% of the theory of O,O-(pyridazin-di-3,6-yl)-bis(ethyl-O-ethyl-thionophosphonic) acid ester, i.e. O-[3-(ethyl-O-ethyl-thionophosphonyl) - pyridazin-6-yl]-ethyl-O-ethyl-thionophosphonic acid ester.

*Analysis.*—Calculated for $C_{12}H_{22}N_2O_4P_2S_2$: (molecular weight 384) N, 7.29%; P, 16.15%; S, 16.68%. Found: N, 7.45%; P, 16.18%; S, 16.62%.

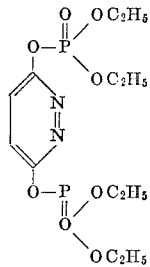

(14₁)

Yield: 58% of the theory of O,O-(pyridazin-di-3,6-yl)-bis (O,O-diethyl-phosphoric) acid ester, i.e. O-[3-(O,O-diethyl - phosphoryl) - pyridazin-6-yl]-O,O-diethyl-phosphoric acid ester.

*Analysis.*—Calculated for $C_{12}H_{22}N_2O_8P_2$: (molecular weight 384) N, 7.30%; P, 16.15%. Found: N, 6.73%; P, 16.48%.

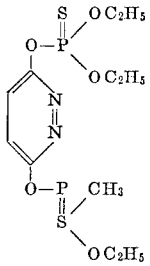

(7₃)

Refractive index: $n_D^{21}=1.5268$.

Yield: 82% of the theory of O,O-(pyridazin-di-3,6-yl)-(O,O-diethyl-thionophosphoric) - methyl-O-ethyl-thionophosphonic) di acid ester, i.e. O-[3-(O,O-diethyl-thionophosphoryl) - pyridazin-6-yl]-methyl-O-ethyl-thionophosphonic acid ester.

*Analysis.*—Calculated for $C_{11}H_{20}N_2O_5P_2S_2$: (molecular weight 386) N, 7.26%; P, 16.07%; S, 16.59%. Found: N, 7.37%; P, 16.26%; S, 15.95%.

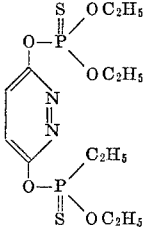

(6₃)

Refractive index: $n_D^{21}$: 1.5229.

Yield: 81% of the theory of O,O-(pyridazin-4-di-3,6-yl) - (O,O - diethyl-thionophosphoric)-(ethyl-O-ethyl-thionophosphonic) di acid ester, i.e., O-[3-O,O-diethyl-thionophosphoryl) - pyridazin - 6 - yl]-ethyl-O-ethyl-thionophosphonic acid ester.

*Analysis.*—Calculated for $C_{12}H_{22}N_2O_5P_2S_2$: (molecular weight 400) N, 7.00%; P, 15.50%; S, 16.00%. Found: N, 7.32%; P, 15.44%; S, 15.50%.

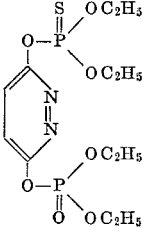

(9₃)

Refractive index: $n_D^{21}=1.4909$.

Yield: 67.5% of the theory of O,O-(pyridazin-di-3,6-yl) - (O,O-diethyl-phosphoric)-(O,O-diethyl-thionophosphoric) di acid ester, i.e. O-[3-(O,O-diethyl-phosphoryl)-pyridazin-6-yl]-O,O-diethyl-thionophosphoric acid ester.

*Analysis.*—Calculated for $C_{12}H_{22}O_7N_2P_2S$: (molecular weight 400) N, 7.00%; P, 15.50%; S, 8.00%. Found: N, 7.05%; P, 15.03%; S, 8.83%.

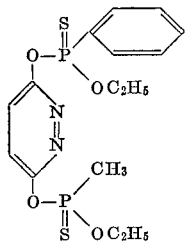

(11₂)

Yield: 54% of the theory of O,O-(pyridazin-di-3,6-yl)-(phenyl - O-ethyl-thionophosphonic)-(methyl-O-ethyl-thionophosphonic) di acid ester, i.e. O-[3-(phenyl-O-ethyl-thionophosphonic acid ester.

*Analysis.*—Calculated for $C_{15}H_{20}N_2O_4P_2S_2$: (molecular weight 418) N, 6.69%; P, 14.83%; S, 15.31%. Found: N, 7.35%; P, 15.24%; S, 15.47%.

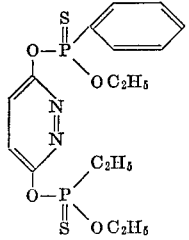

(15₁)

Yield: 50% of the theory of O,O-(pyridazin-di-3,6-yl)-(phenyl - O - ethyl-thionophosphonic)-(ethyl-O-ethyl-thionophosphonic) di acid ester, i.e. O-[3-(phenyl-O-ethyl-thionophosphonyl - pyridazin - 6 - yl]-ethyl-O-ethyl-thionophosphonic acid ester.

*Analysis.*—Calculated for $C_{16}H_{22}N_2O_4P_2S_2$: (molecular weight 432) N, 6.50%. Found: N, 6.34%.

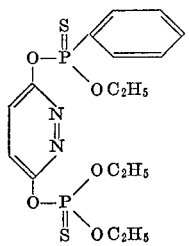

(16₁)

Yield: 77.5% of the theory of O,O-(pyridazin-di-3,6-yl) - (phenyl - O - ethyl-thionophosphonic)-(O,O-diethyl-phosphoric) di acid ester, i.e. O-[3-(phenyl-O-ethyl-thionophosphonyl) - pyridazine-6-yl]-O,O-diethyl-phosphoric acid ester.

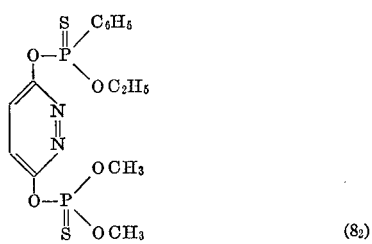

(8₂)

Refractive index: $n_D^{21}=1.5728$.

Yield: 69% of the theory of O,O-(pyridazin-di-3,6-yl)-(O,O - dimethyl - thionophosphoric)-(phenyl-O-ethyl-thionophosphonic) di acid ester, i.e. O-[3-(O,O-dimethyl-thionophosphoryl) - pyridazin - 6-yl]-phenyl-O-ethyl-thionophosphonic acid ester.

*Analysis.*—Calculated for $C_{14}H_{18}N_2O_5P_2S_2$: (molecular weight 420) N, 6.67%; P, 14.78%; S, 15.25%. Found: N, 6.03%; P, 14.94%; S, 14.97%.

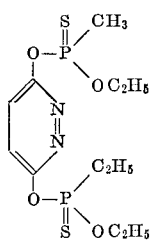

(4₃)

Refractive index: $n_D^{21}=1.5343$.

Yield: 35% of the theory of O,O-(pyridazin-di-3,6-yl)-(methyl - O - ethyl-thionophosphonic)-(ethyl-O-ethyl-thionophosphonic) di acid ester, i.e. O-[3-(methyl-O-ethyl-thionophosphonyl) - pyridazin-6-yl]-ethyl-O-ethyl-thionophosphonic acid ester.

*Analysis.*—Calculated $C_{11}H_{20}N_2O_4P_2S_2$: (molecular weight 370) N, 7.57%; P, 16.75%; S, 17.29%. Found: N, 7.83%; P, 16.08%; S, 16.96%.

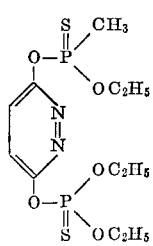

(12₂)

Refractive index: $n_D^{16.5}=1.5019$.

Yield: 87.5% of the theory of O,O-(pyridazin-di-3,6-yl-(O,O-diethyl-phosphoric)-(methyl - O - ethyl - thionophosphonic) di acid ester, i.e., O-[3-(O,O-diethyl-phosphoryl)-pyridazin-6-yl] - methyl - O - thionophosphonic acid ester.

*Analysis.*—Calculated for $C_{11}H_{20}N_2O_6P_2S$: (molecular weight 370) N, 7.56%; P, 16.75%; S, 8.65%. Found: N, 7.40%; P, 17.18%; S, 8.79%.

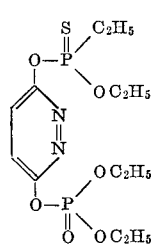

(10₃)

Yield: 71% of the theory of O,O-(pyridazin-di-3,6-yl)-(O,O-diethyl-phosphoric)-(ethyl - O - ethyl - thionophosphonic) di acid ester, i.e. O-[3-(O,O-diethyl-phosphoryl)-pyridazin-6-yl]-ethyl - O - ethyl-thionophosphonic acid ester.

*Analysis.*—Calculated for $C_{12}H_{22}N_2O_6P_2S$: (molecular weight 384) N, 7.31%. Found: N, 7.84%.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. A pyridazinyl di-phosphorus acid ester of the formula

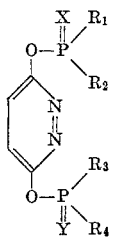

in which $R_1$ and $R_3$, each individually, is lower alkoxy of 1–6 carbon atoms, $R_2$ and $R_4$, each individually, is selected from the group consisting of lower alkyl of 1–6 carbon atoms, lower alkoxy of 1–6 carbon atoms and phenyl, and X and Y, each individually, is selected from the group consisting of oxygen and sulfur.

2. An ester according to claim 1 wherein $R_1$ and $R_3$, each individually, is $C_{1-4}$ alkoxy, $R_2$ and $R_4$, each individually, is selected from the group consisting of $C_{1-4}$ alkyl, $C_{1-4}$ alkoxy and phenyl, and X and Y, each individually, is selected from the group consisting of oxygen and sulfur.

3. An ester according to claim 1 wherein $R_1$ and $R_3$, each individually, is $C_{1-4}$ alkoxy, $R_2$ and $R_4$, each individually, is selected from the group consisting of $C_{1-4}$ alkyl, $C_{1-4}$ alkoxy and phenyl, X is selected from the group consisting of oxygen and sulfur, and Y is sulfur.

4. An ester according to claim 1 wherein X and Y are both sulfur.

5. An ester according to claim 1 wherein X is oxygen and Y is sulfur.

6. An ester according to claim 1 wherein such compound is O-[3-(O,O-diethyl-thionophosphoryl)-pyridazin-6-yl] - O,O - diethyl-thionophosphoric acid ester of the formula

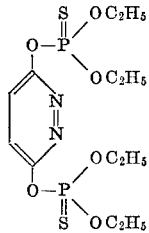

7. An ester according to claim 1 wherein such compound is O-[3-(methyl-O-ethyl-thionophosphonyl)-pyridazin-6-yl]-methyl-O-ethyl-thionophosphonic acid ester of the formula

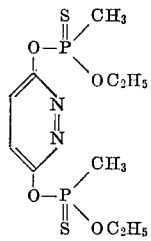

8. An ester according to claim 1 wherein such compound is O-[3-(O,O-diethyl-thionophosphoryl)-pyridazin-6-yl]-phenyl-O-ethyl-thionophosphonic acid ester of the formula

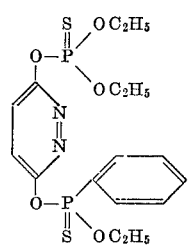

9. An ester according to claim 1 wherein such compound is O-[3-(O,O - diethyl-phosphoryl)-pyridazin-6-yl)-O,O-diethyl-thionophosphoric acid ester of the formula

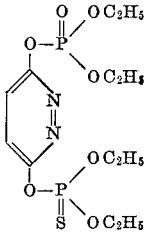

10. An ester according to claim 1 wherein such compound is O-[3-phenyl-O-ethyl-thionophosphonyl)-pyridazin-6-yl]-methyl-O-ethylthionophosphonic acid ester of the formula

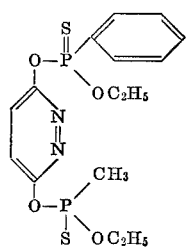

References Cited

UNITED STATES PATENTS

| | | | |
|---|---|---|---|
| 2,759,938 | 8/1956 | Du Brenil | 260—250 |
| 2,918,468 | 12/1959 | Dixon et al. | 260—250 |
| 2,922,812 | 1/1960 | Gilbert et al. | 424—260 |
| 3,155,662 | 11/1964 | Stormann-Menninger et al. | 260—250A |

NICHOLAS S. RIZZO, Primary Examiner

U.S. Cl. X.R.

424—200

PO-1050
(5/69)

UNITED STATES PATENT OFFICE
CERTIFICATE OF CORRECTION

Patent No. 3547920  Dated December 15, 1970

Inventor(s) Christa Fest, Ingeborg Hammann, Wilhelm Stendel & Gunter Unterstenhofer.

It is certified that error appears in the above-identified patent and that said Letters Patent are hereby corrected as shown below:

Col. 2, line 44, "(IaI)" should be -- (IIa) --

Col. 6, lines 52 and 53, "contaning" should be -- containing

Col. 15, Formula (16$_1$)

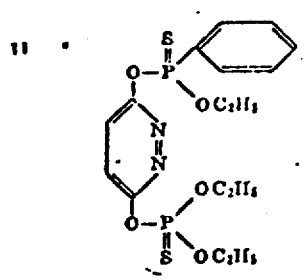 " should be -- 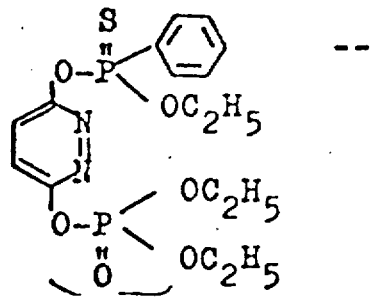 --

Col. 16, line 23

"16.75%" should be --15.75%--

Col. 16, Formula (12$_2$)

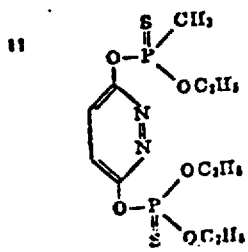 " should be -- 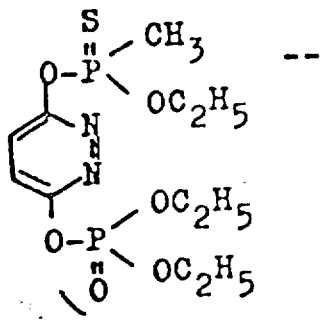 --

PO-1050
(5/69)

UNITED STATES PATENT OFFICE
CERTIFICATE OF CORRECTION

Patent No. 3,547,920                     Dated December 15, 1970

Inventor(s)                  PAGE - 2

It is certified that error appears in the above-identified patent and that said Letters Patent are hereby corrected as shown below:

Col. 14, Formula (14$_1$)

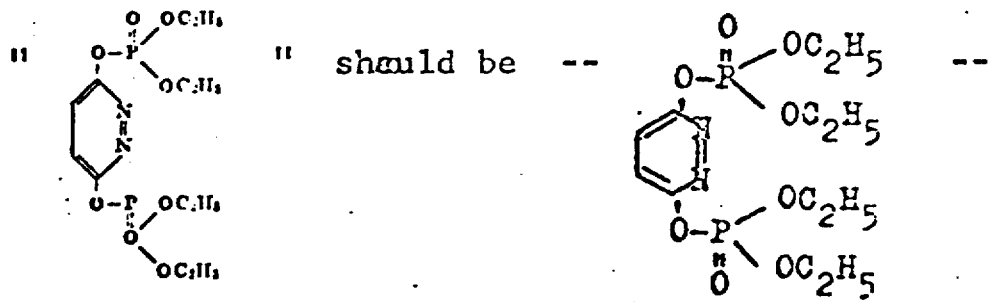

Col. 14, Formula (7$_3$)

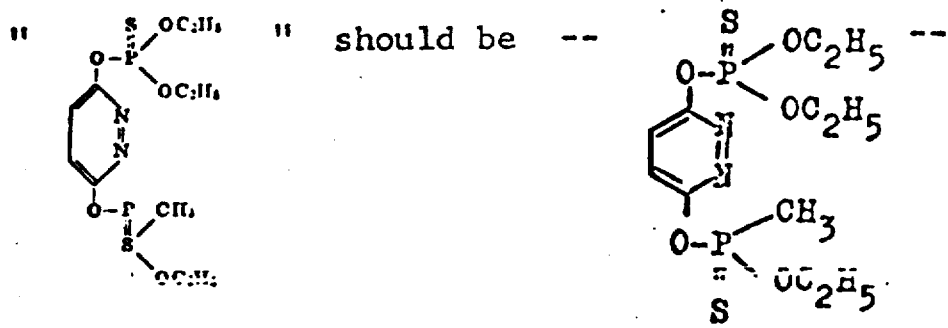

Signed and sealed this 30th day of March 1971.

(SEAL)
Attest:

EDWARD M. FLETCHER, JR.
Attesting Officer

WILLIAM E. SCHUYLER, JR
Commissioner of Patents